United States Patent [19]

Miles et al.

[11] 4,190,704
[45] Feb. 26, 1980

[54] PROTECTED CALCIUM ANODE

[75] Inventors: Melvin H. Miles; Aaron N. Fletcher; Dwight A. Fine, all of Ridgecrest, Calif.

[73] Assignee: The United States of America as represented by the Secretary of the Navy, Washington, D.C.

[21] Appl. No.: 8,997

[22] Filed: Feb. 5, 1979

[51] Int. Cl.² .......................................... H01M 4/36
[52] U.S. Cl. .................................. 429/103; 429/112; 429/199
[58] Field of Search ................ 429/112, 199, 188, 103

[56] References Cited

U.S. PATENT DOCUMENTS

| | | | |
|---|---|---|---|
| 3,132,971 | 5/1964 | Selis et al. | 429/199 X |
| 3,527,615 | 9/1970 | Clark et al. | 429/112 |
| 3,533,844 | 10/1970 | Klopp et al. | 429/103 |
| 4,041,217 | 8/1977 | Collins | 429/112 |
| 4,068,045 | 1/1978 | Abrams | 429/103 X |

Primary Examiner—Charles F. LeFevour
Attorney, Agent, or Firm—R. S. Sciascia; W. Thom Skeer; John H. Lynn

[57] ABSTRACT

A calcium electrode for an electrochemical cell with an electrolyte consisting of molten nitrates and up to 10 mole percent halides.

9 Claims, 6 Drawing Figures

PROTECTED CALCIUM ANODE

BACKGROUND OF THE INVENTION

1. Field of the Invention

The present invention relates generally to electrochemical cells. More particularly, the present invention relates to the use of calcium as the anode in an electrochemical cell or thermal battery with a molten nitrate electrolyte.

2. Description of the Prior Art

Generally, thermal batteries operate at temperatures between 500° C. and 600° C. using the LiCl - KCl, 59–41 mole percent, eutectic which melts at 352° C. Formation of $CaLi_2$ at the anode limits the utility of prior art devices, and high operating temperatures cause difficulties in the use of these devices.

SUMMARY OF THE INVENTION

Calcium is used as the anode material in an electrochemical cell with an electrolyte consisting of molten nitrates and up to 10 mole percent halides. The calcium anode was used in pure $LiNO_3$, in pure $KNO_3$, and in both $LiNO_3$ and $KNO_3$ with 5 mole percent halide added. The calcium anode was also used in $LiNO_3$ containing 10 mole percent LiCl and in a solution which was 54 mole percent $KNO_3$, 36 mole percent $LiNO_3$ and 10 mole percent LiCl. Tests were done at temperatures ranging from 250° C. to 400° C.

The calcium anode in molten nitrates is attractive for use in thermal batteries because it could operate at a lower temperature than prior art thermal batteries and would eliminate the problems caused by formation of $CaLi_2$.

Since molten nitrates are strong oxidizing agents, a passivating film on the calcium surface is required to restrict the corrosive reaction of the molten nitrate with the calcium anode. This protective layer must permit the passage of calcium ions into the solution during battery operation. Halides added to the electrolyte attack the protective layer sufficiently to allow passage of ions through the layer.

An object of the invention is to provide a calcium anode for use in molten nitrate electrolytes where the electrolyte can also serve as the oxidizer.

A further object of the invention is to provide an anode and an electrolyte which will operate at lower temperatures than prior art thermal batteries.

DESCRIPTION OF THE PREFERRED EMBODIMENT

Figure 1:
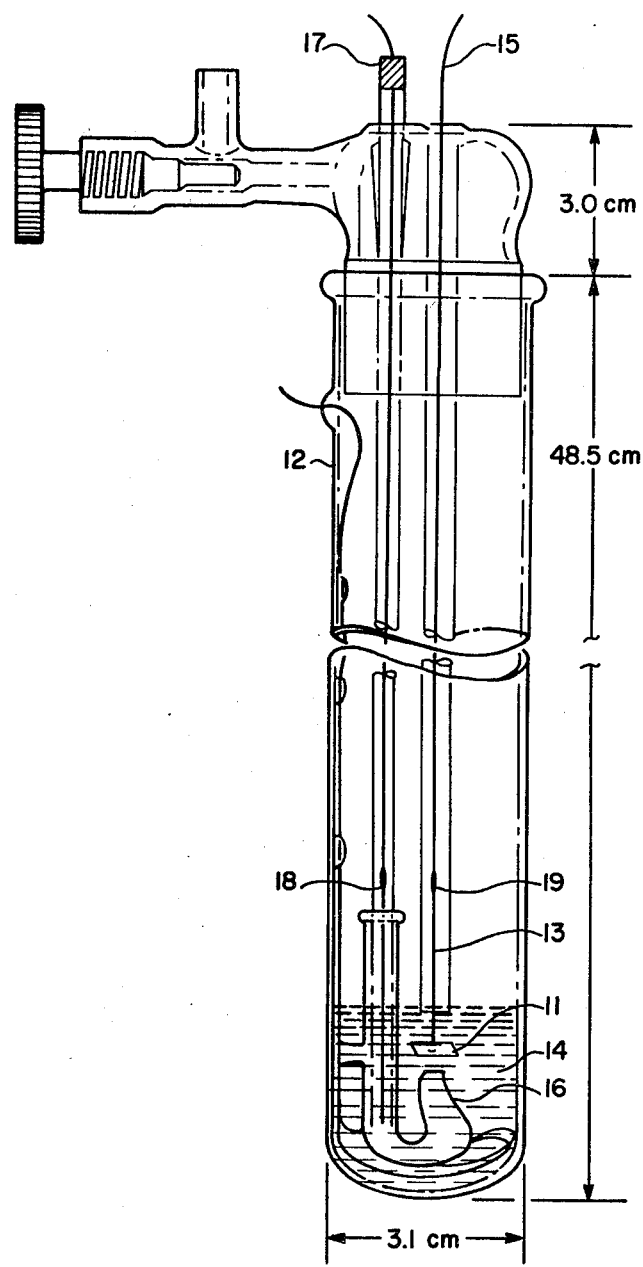
FIG. 1 shows the calcium anode in an electrochemical cell.

The calcium electrode 11 is the anode in the electrochemical cell 12 shown in FIG. 1. A plate 11 was cut from a metal sheet which was 99% calcium and 0.5 mm thick. The major impurity in the metal was magnesium. The area of calcium electrode 11 was about 1 $cm^2$ in developmental models of the invention.

Calcium electrode 11 was cleaned with dilute nitric acid in dimethyl formamide, DMF, until a bright metal surface was obtained; and then calcium electrode 11 was rinsed in DMF. The back side of calcium electrode 11 was spot welded to the aluminum working electrode lead 13. The back side and edges of calcium electrode 11 and the portion of lead 13 that would be immersed in the electrolyte 14 were masked with a protective coating to protect these metal surfaces from the corrosive effects of the electrolyte. The front surface of calcium electrode 11 was recleaned with nitric acid in DMF just prior to use. An external nickel lead wire 15 was connected to aluminum working electrode lead 13, and the lead wires were used to position calcium electrode 11 within 1–2 mm from the tip of a Luggin capillary 16 in a reference electrode 17.

Electrode potentials were measured against a 0.1 M $Ag/AgNO_3$ reference electrode 17 which was in an electrolyte which was 50 mole percent $KNO_3$ and 50 mole percent $NaNO_3$. A Tesla coil spark was used to form a minute hole through the glass tip of reference electrode 17 to provide contact while allowing minimal electrolyte leakage. The electrolytic resistance through this hole was generally greater than 10,000 ohms. The Ni/Ag junction 18 of reference electrode 17 and the Ni/Al junction 19 of the working electrode 11 were positioned at about the same level in cell 12 to eliminate thermocouple effects due to temperature gradients.

Temperature control was maintained by placing electrochemical cell 12 in a fluidized sand bath.

Molten nitrate solutions were prepared from reagent grade chemicals which were dried overnight in a vacuum oven at 150° C. 28.00 g of nitrate were used in each experiment. When not in use, these salts were stored in a desiccator containing anhydrous calcium sulfate.

Figure 2:
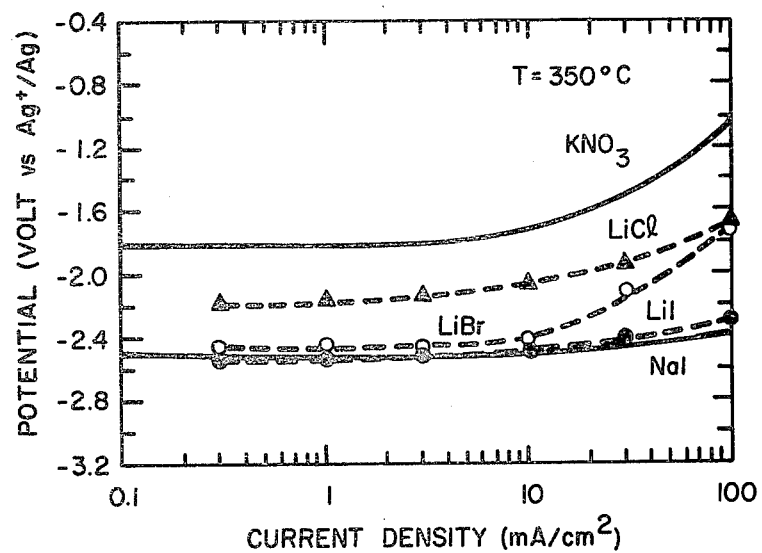
FIG. 2 is a graph of potential versus current density measurements for the calcium anode in molten $KNO_3$.

The electrochemical behavior of calcium anode 11 in molten nitrates was determined galvanostatically. Potential measurements were recorded at current densities of 100, 30, 10, 3, 1 and 0.3 $mA/cm^2$. Open circuit potentials corresponding to these current densities were determined. The results for calcium anode 11 in molten $KNO_3$ at 350° C. are shown in FIG. 2. The graph for $KNO_3$ represents the average of nine different experiments. The standard deviation for the potentials ranged from $\pm 0.14$ V at 100 $mA/cm^2$ to $\pm 0.040$ V at 1 $mA/cm^2$. The other potential-current density lines in FIG. 2 show how addition of about 5 mole percent LiCl, LiBr, LiI or NaI to the molten $KNO_3$ improves the performance of the calcium anode.

Figure 3:
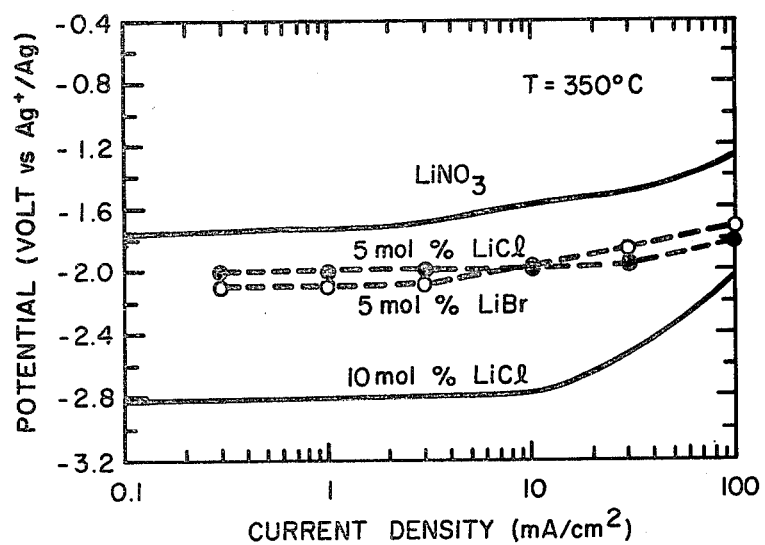
FIG. 3 is a graph of potential versus current measurements for the calcium anode in molten $LiNO_3$.

Constant current investigations of calcium anode 11 in molten $LiNO_3$ systems at 350° C. are shown in FIG. 3. The graph for pure $LiNO_3$ represents the average of four different experiments with standard deviations of $\pm 0.056$ V at 100 $mA/cm^2$ amd $\pm 0.017$ V at 1 $mA/cm^2$. The graph for the solution containing about 10 mole percent LiCl represents the average of five experiments in which the standard deviations were $\pm 0.155$ V at 100 $mA/cm^2$ and $\pm 0.044$ V at 1 $mA/cm^2$.

Figure 4:
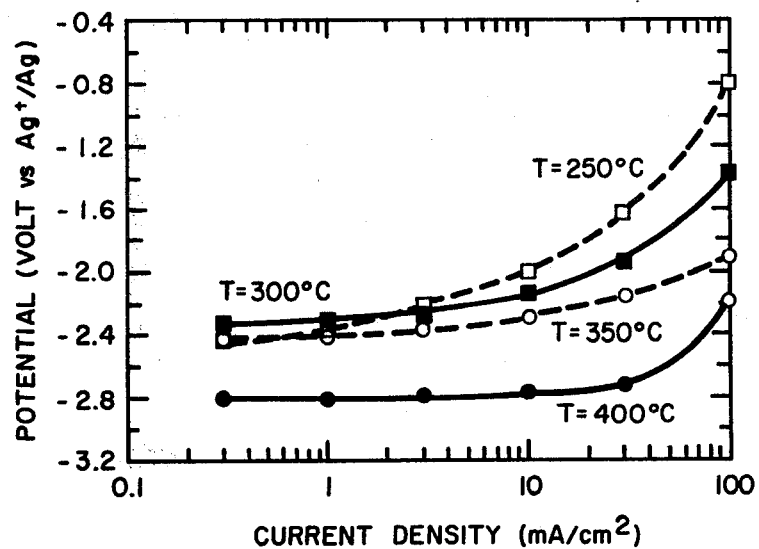
FIG. 4 is a graph of potential versus current density measurements for the calcium anode in a mixture of $KNO_3$ and $LiNO_3$ at various temperatures.

FIG. 4 shows the effect of varying the temperature on the potential current density measurements for calcium anode 11 in a solution which was about 54 mole percent $KNO_3$, 36 mole percent $LiNO_3$ and 10 mole percent LiCl.

Figure 5:
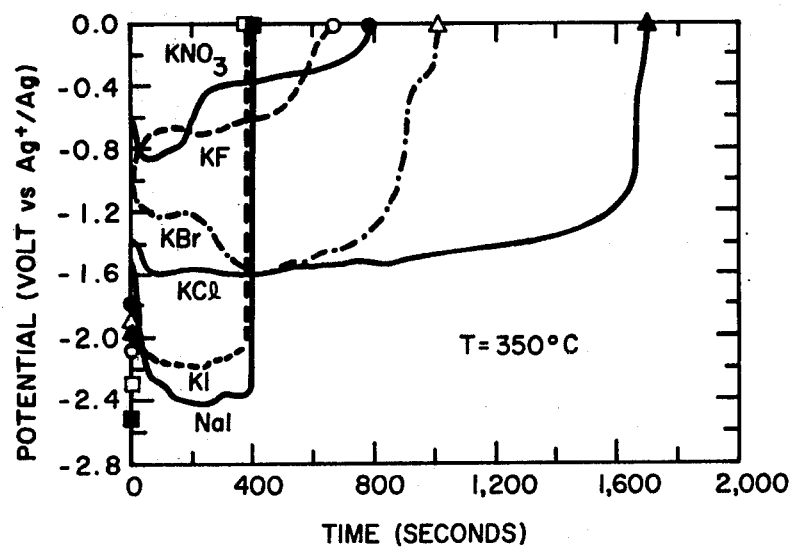
FIG. 5 is a graph of the potential of the calcium anode as a function of time.

Constant current experiments at 100 mA/cm² were used to determine the long-term behavior of calcium anode 11. Potential versus time plots are shown in FIG. 5 for calcium anode 11 in pure molten $KNO_3$ and in molten $KNO_3$ containing 5 mole percent of various salts.

Figure 6:
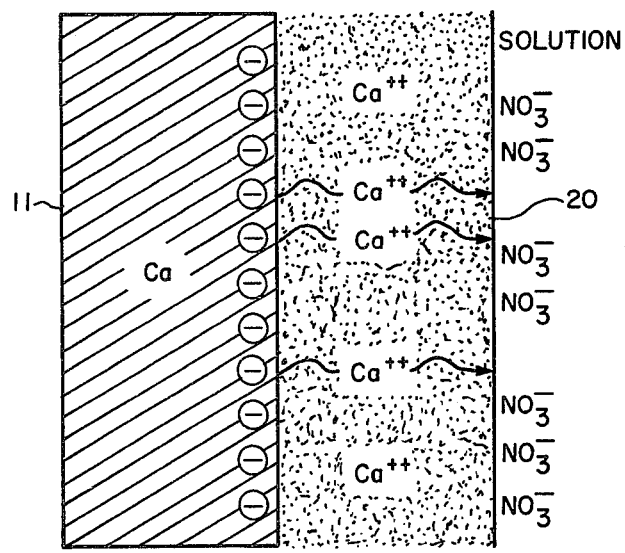
FIG. 6 illustrates the operation of the passivating layer on the calcium anode.

Referring to FIG. 6, a passivating film 20 of CaO forms on calcium anode 11 during its reaction with molten nitrate. Studies indicate that the net reaction is:

$$14 Ca + 6NO_3 \rightarrow 14CaO \downarrow + 2N_2 \uparrow + N_2O \uparrow + 30$$

The rate of the anode reaction is determined largely by passivating film 20. The experiments show that addition of halides that promote breaks in the CaO passivating film 20 greatly improves the electrode knietics and the open circuit potential.

What is claimed is:

1. An electrochemical cell, comprising:
   an electrolyte consisting of molten nitrate;
   a cathode immersed in said electrolyte;
   an anode consisting of calcium immersed in said electrolyte; and
   a controllable passivating layer of CaO on said anode for restricting the corrosive reaction of said molten nitrate electrolyte with said anode.

2. An electrochemical cell according to claim 1 wherein said electrolyte is $LiNO_3$.

3. An electrochemical cell according to claim 1 wherein said electrolyte is $KNO_3$.

4. An electrochemical cell according to claim 1 wherein said electrolyte is about 60 mole percent $KNO_3$ and about 40 mole percent $LiNO_3$.

5. An electrochemical cell comprising:
   an electrolyte consisting of molten nitrate containing about 5 mole % halide;
   a cathode immersed in said electrolyte;
   an anode consisting of calcium immersed in said electrolyte; and
   an controllable passivating layer of CaO on said anode for restricting the corrosive reaction of said molten nitrate electrolyte with said anode.

6. An electrochemical cell according to claim 5 wherein said molten nitrate is $KNO_3$.

7. An electrochemical cell according to claim 5 wherein said nitrate is $LiNO_3$.

8. An electrochemical cell, comprising:
   an electrolyte consisting of molten $LiNO_3$ and up to 10 mole percent LiCl;
   a cathode immersed in said electrolyte;
   an anode consisting of calcium immersed in said electrolyte; and
   a controllable passivating layer of CaO on said anode for restricting the corrosive reaction of said molten nitrate with said anode.

9. An electrochemical cell, comprising:
   an electrolyte consisting of about 54 mole percent molten $KNO_3$, about 36 mole percent molten $LiNO_3$ and about 10 mole percent LiCL;
   a cathode immersed in said electrolyte;
   an anode consisting of calcium immersed in said electrolyte; and
   a controllable passivating layer of CAO on said anode for restricting the corrosive reaction of said molten nitrate with said anode.

* * * * *